United States Patent [19]

Suzuki

[11] Patent Number: 4,625,284
[45] Date of Patent: Nov. 25, 1986

[54] FUEL GAUGE FOR VEHICLES

[75] Inventor: Koichi Suzuki, Fuchu, Japan

[73] Assignee: Nissan Motor Co., Ltd., Yokohama, Japan

[21] Appl. No.: 660,204

[22] Filed: Oct. 12, 1984

[30] Foreign Application Priority Data

Oct. 14, 1983 [JP] Japan ................................. 58-190965

[51] Int. Cl.$^4$ ............................................ G01F 23/18
[52] U.S. Cl. ......................................... 364/509; 73/313
[58] Field of Search .......................... 73/313, 308, 113; 364/509, 573, 575

[56] References Cited

U.S. PATENT DOCUMENTS

| | | | |
|---|---|---|---|
| 4,064,396 | 12/1977 | Panarello | 364/573 |
| 4,386,406 | 5/1983 | Igarshi et al. | 73/313 X |
| 4,402,048 | 8/1983 | Tsuchida et al. | 364/509 X |
| 4,470,296 | 9/1984 | Kobayashi et al. | 73/113 |
| 4,502,124 | 2/1985 | Grohmann et al. | 364/509 X |
| 4,509,044 | 4/1985 | Yachida | 73/313 X |
| 4,513,616 | 4/1985 | Bezard et al. | 73/313 X |

FOREIGN PATENT DOCUMENTS 0094298 11/1983 European Pat. Off. .
2928767 1/1981 Fed. Rep. of Germany .
2122750 1/1984 United Kingdom .

OTHER PUBLICATIONS

Publication-"Computer Dictionary & Handbook", 3rd Edition, by C. J. Sippi et al, p. 144.

Primary Examiner—Daniel M. Yasich
Attorney, Agent, or Firm—Schwartz, Jeffery, Schwaab, Mack, Blumenthal & Evans

[57] ABSTRACT

A fuel gauge for vehicles includes a memory circuit for storing a value for residual quantity of fuel contained in a fuel tank when an ignition switch is turned off and a display unit for displaying the value for residual quantity of fuel stored in the memory circuit when the ignition switch is turned on so that an indication for residual quantity of fuel contained in the tank when the ignition switch is turned off is not different from an indication for residual quantity of fuel in the tank when the ignition switch is turned on even if the tank is deformed due to change of an internal pressure in the tank.

11 Claims, 3 Drawing Figures

FUEL GAUGE FOR VEHICLES

BACKGROUND OF THE INVENTION

1. Field of the Invention

The present invention relates to a fuel gauge for vehicles, and more particularly to a fuel gauge in which an indication for residual quantity of fuel contained in a fuel tank when an ignition switch was turned off to stop an engine is not different from an indication for residual quantity of fuel contained in the tank when the ignition switch is turned on to start the engine after a while.

2. Description of the Prior Art

Heretofore, needle type fuel have been used to indicate the amount of fuel contained in a fuel tank of a vehicle. Recently, there is however a tendency that a digital fuel gauges have been employed using an electronic circuit is used.

When the engine of a vehicle is rotated, the temperature of the fuel in the fuel tank rises due to heat of the engine, thereby evaporating a portion of fuel, so that the vapor pressure is enhanced and the internal pressure in the fuel tank is increased. Consequently, the fuel tank is deformed to increase the capacity of the fuel tank and the surface level of fuel in the tank is lowered. However, when the engine is stopped, the capacity of the fuel tank is reduced and the surface level of fuel in the tank tends to increase, since the temperature of fuel in the tank is decreased, and the vapor pressure is lower as compared with the surface level of fuel in the tank at the time when the engine is operated or for a while after a engine is stopped. Therefore, since a position of a float of a fuel sensor is somewhat different between the time when the engine is operated and the time when a driver gets in the vehicle after the engine is stopped for a long time, the indication for residual quantity of fuel contained in the tank is different.

SUMMARY OF THE INVENTION

It is an object of the present invention to provide a fuel gauge for vehicles in which the indication for residual quantity of fuel contained in the tank is not different between a time when an ignition switch is turned off to stop an engine and a time when the ignition switch is turned on to start the engine even if the fuel tank is deformed due to change of an internal pressure in the tank.

In accordance with the present invention, since a value for residual quantity of fuel contained in the fuel tank when the ignition switch is turned off is stored and the stored value of residual quantity of fuel is displayed when the ignition switch is turned on, the indication for residual quantity of fuel contained in the tank is not different between a time when an ignition switch is turned off and a time when the ignition switch is turned on even if the fuel tank is deformed due to change of an internal pressure in the fuel tank.

BRIEF DESCRIPTION OF THE DRAWINGS

This and other objects of the present invention will be more apparent upon consideration of the following detailed description of a preferred embodiment, taken in conjunction with the accompanying drawings in which.

DESCRIPTION OF THE INVENTION

To facilitate the understanding of the present invention, a brief reference will be made to a prior art fuel gauge illustrated in FIG. 1.

Figure 1:
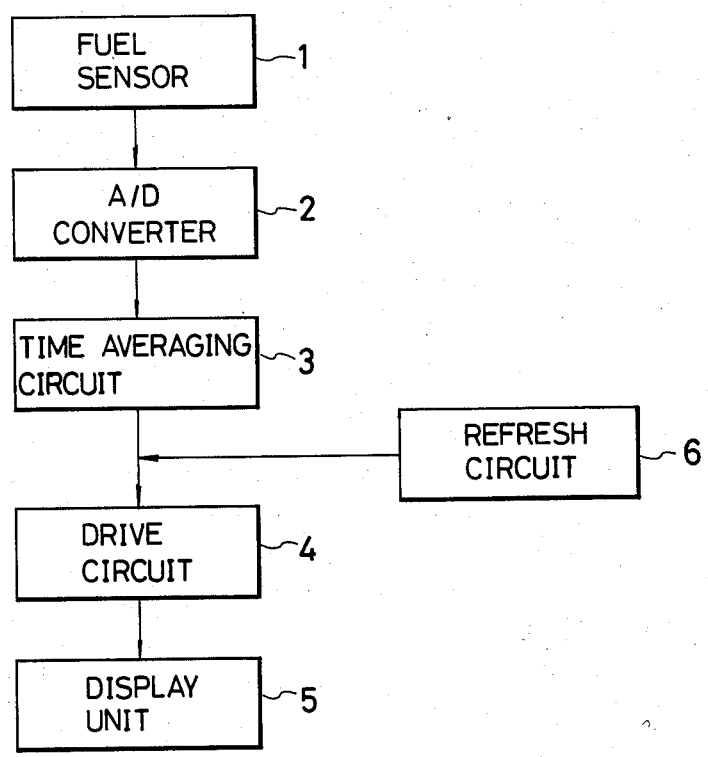
FIG. 1 is a block diagram of a prior art fuel gauge.

The fuel gauge shown in FIG. 1 is of a digital type and includes a fuel sensor 1 which detects a surface level of fuel contained in a fuel tank and converts it to an electric signal. The electric signal indicating a residual quantity of fuel is converted to a digital signal by an A-D converter 2. The digital signal converted by the converter 2 is averaged by a time averaging circuit 3 at regular intervals of time to calculate the average value for a residual quantity of fuel. The residual quantity is displayed by a display unit 5 through a drive circuit 4 while the displayed value is renewed by a display renewal signal produced by a refresh circuit 6 at regular intervals of time.

Such a prior art fuel gauge does not consider change of a capacity of the fuel tank due to the internal pressure in the tank. The vapor pressure in the tank varies due to the evaporation of fuel caused by the heat of the engine when the engine is operated. There is less evaporation when the engine is stopped or for a while after the engine is started. Therefore, there is a problem in that the indication for residual quantity of fuel contained in the tank when an ignition switch was turned off to stop an engine is different from the indication for residual quantity of fuel contained in the tank when the ignition switch is turned on to start the engine after a while.

The fuel gauge according to the present invention eliminates such a problem and will now be described with reference to FIGS. 2 and 3.

Figure 2:
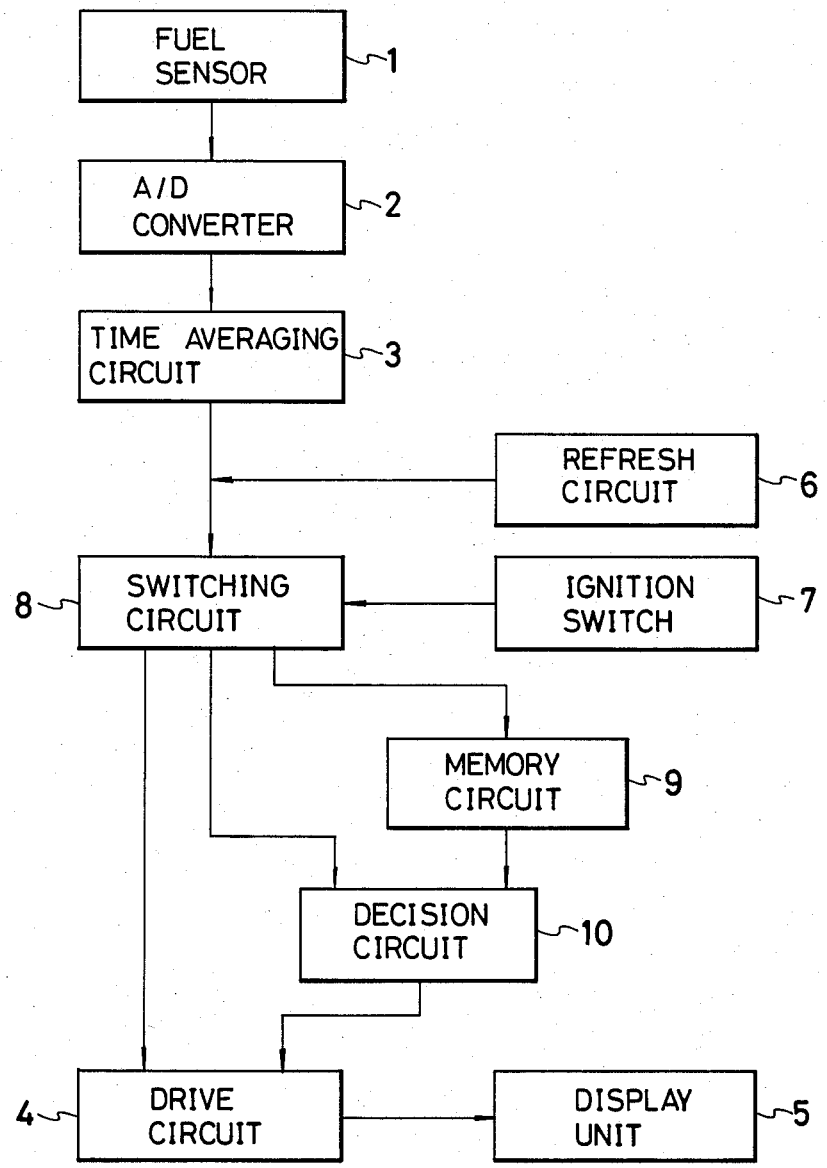
FIG. 2 is a block diagram of an embodiment of a fuel gauge according to the present invention.
Figure 3:
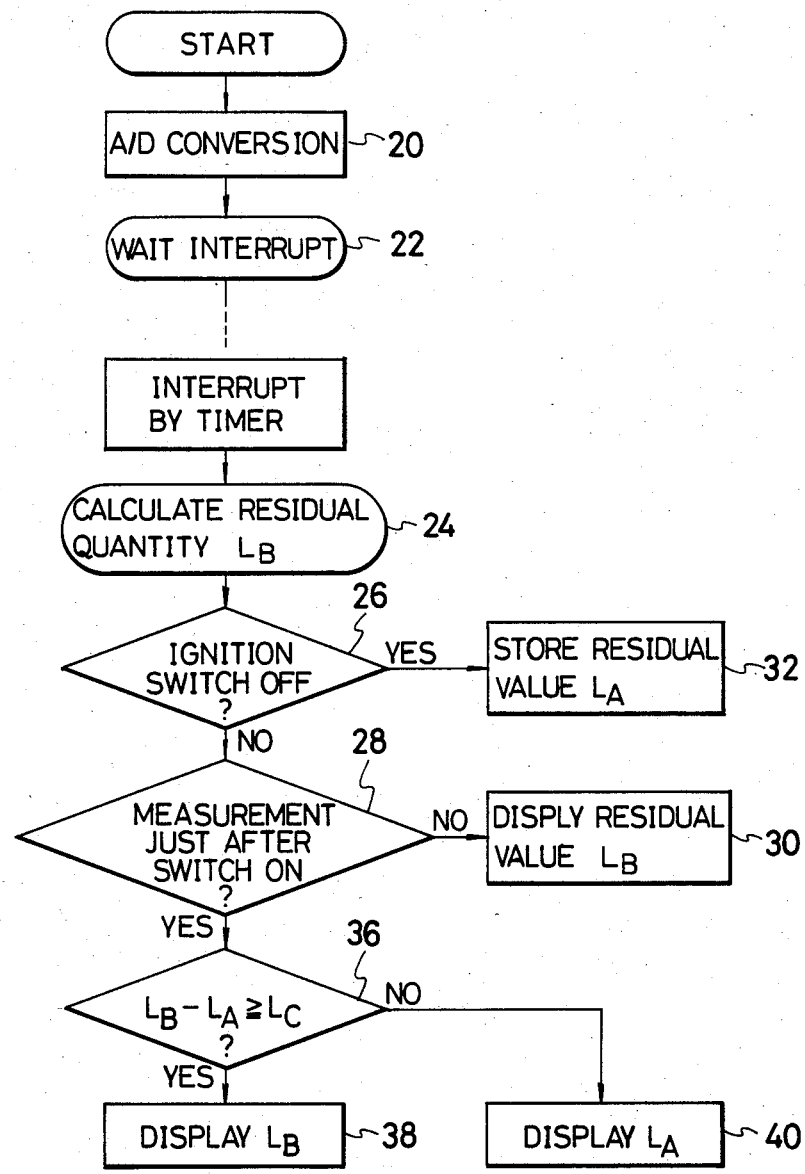
FIG. 3 is a flowchart showing the operation of the fuel gauge according to the present invention.

Referring to FIG. 2, there is shown an embodiment of a fuel gauge according to the present invention. In FIG. 2, the same elements as in FIG. 1 are designated by like reference numerals.

Conventional structural components have not been described in detail. U.S. Pat. No. 4,470,296 provides a basic explanation of such components.

The fuel gauge shown in FIG. 2 includes a switching circuit 8 for attaining switching operation by on and off operation of an ignition switch 7, a memory circuit 9 for storing a value of residual quantity of fuel and a decision circuit 10 in addition to the configuration of the prior art fuel gauge shown in FIG. 1. The decision circuit 10 determines whether or not fuel has been supplied in a fuel tank of a vehicle while ignition switch was turned off. Namely, the decision circuit 10 determines whether to display a value for quantity of fuel increased by supply of fuel when fuel has been supplied in the tank or to display the former value for residual quantity of fuel at the time of the ignition switch being previously turned off when fuel has not been supplied in the tank.

Operation of the fuel gauge will now be described with reference to FIGS. 2 and 3.

When the ignition switch 7 is turned on, an output signal is produced from the fuel sensor 1 which indicates a residual quantity of fuel contained in the tank. This signal is converted to a digital signal by the A-D converter 2 (step 20). The digital signal is supplied to the time averaging circuit 3. However, the time averaging circuit 3 is delayed until an interrupt signal which is generated at regular intervals of time is applied thereto (step 22).

When the interrupt signal is supplied to the time averaging circuit 3, the circuit 3 averages the digital signal of the converter 2 indicating the residual quantity of fuel. This value is supplied to the switching circuit 8 while being renewed by the refresh circuit 6 at regular intervals of time (step 24).

Then, a decision is made as to whether the ignition switch 7 is in the off state or not (step 26). If the ignition switch 7 is on. The circuitry determines, whether the measurement was carried out just after switch 7 was turned on (step 28). Consequently, when the measurement is not carried out soon after switch 7 is turned on, (i.e., after a predetermined period of time) the switching circuit 8 sends the output signal of the time averaging circuit 3 indicating the residual quantity of fuel through the drive circuit 4 to the display unit 5 so that the residual quantity of fuel is displayed in the display unit 5 (step 30). When the ignition switch 7 is off, a value $L_A$ for residual quantity of fuel at this time is stored in the memory circuit 9 through the switching circuit 8 (step 32). When the measurement is carried out just after switch 7 is on, the display is delayed until after the next step 36. When the ignition switch 7 is turned on, the value $L_A$ for residual quantity of fuel stored in the memory circuit 9 is supplied to the decision circuit 10 to compare it with a value $L_B$ for residual quantity of fuel which is calculated by the circuit 3 at this time and supplied from the switching circuit 8 to the decision circuit 10 (step 36). In this comparison, the value $L_A$ is subtracted from the value $L_B$ to calculate a difference therebetween and the difference is compared with a predetermined value Lc. If the difference is larger than the predetermined value Lc, it is determined that fuel has been supplied in the tank between the time that the ignition switch was turned off and the time that the ignition switch was turned on, and the value $L_B$ for residual quantity of fuel at this time is displayed in the display unit (step 38). However, if the difference is less than or equal to the predetermined value Lc, it is determined that fuel has not been supplied in the tank after the ignition switch was turned off. Therefore, value $L_A$ for residual quantity of fuel at the time when the ignition switch was turned off previously and which has been stored in the memory circuit 9 is sent to the drive circuit 4 so that it is displayed in the display unit 5 (step 40).

In summary, when fuel has not been supplied in the fuel tank until the ignition switch is turned on, after the ignition switch was turned on, the indication for residual quantity of fuel contained in the tank when the ignition switch was turned off is equal to the indication for residual quantity of fuel in the tank when the ignition switch is turned on to start the engine after a while. After the ignition switch is turned on, the indication displayed in the unit 5 is renewed at regular intervals of time defined by the refresh circuit 6.

Various modifications will become possible for those skilled in the art after receiving the teachings of the present disclosure without departing from the scope thereof.

What is claimed is:

1. A fuel gauge for indicating the residual quantity of fuel contained in a fuel tank, comprising:
    an ignition switch;
    a fuel sensing means for detecting a level of fuel contained in the fuel tank;
    a calculating means having an output for calculating a residual quantity of fuel according to said level;
    memory means, responsive to the ignition switch, for storing said residual quantity calculated by said calculating means upon deactivation of the ignition switch;
    displaying means for displaying said residual quantity of fuel in the fuel tank; and
    switching means responsive to operation of the ignition switch for selectively providing one of said calculating means output and said stored residual quantity to said displaying means, wherein said switching means provides said stored residual quantity when the ignition switch has been activated less than a predetermined period of time and fuel has not been added to the fuel tank, and said switching means provides said calculating means output when the ignition switch has been activated for said predetermined period of time.

2. A fuel gauge as claimed in claim 1, further comprising:
    decision means for determining whether fuel was supplied to the fuel tank before the ignition switch was turned on and supplying said calculating means output to said displaying means when fuel has been supplied to the tank.

3. A fuel gauge as claimed in claim 2, wherein said decision means comprises:
    comparison means for comparing said stored residual quantity with a residual quantity of fuel calculated when the ignition switch is turned on, wherein said comparison means calculates a difference therebetween and compares said difference with a predetermined value; and
    wherein said comparison means determines that fuel was supplied in the tank when said difference exceeds a predetermined value and said calculated residual quantity is supplied to said displaying means; and wherein said comparison means determines that fuel has not been supplied in the tank when said predetermined value exceeds said difference and said stored residual quantity is supplied to said displaying means.

4. A fuel gauge as claimed in claim 2, wherein said memory means comprises a memory circuit connected to said switching means and to said decision means for storing a residual quantity of fuel when the ignition switch is turned off and for supplying said stored residual quantity to said decision means.

5. A fuel gauge as claimed in claim 4, wherein said decision means receives an output of said switching means and an output of said memory circuit, and wherein an output of said decision means is supplied to said displaying means.

6. A fuel gauge as claimed in claim 5, wherein said fuel sensing means comprises a fuel sensor, an A/D converter, and a time averaging circuit wherein an output of said fuel sensor is supplied to said A/D converter, and an output of said A/D converter is supplied to said time averaging circuit.

7. A fuel gauge as claimed in claim 6, wherein said displaying means comprises a drive circuit and a display unit.

8. A method of indicating an amount of fuel contained in a fuel tank, comprising the steps of:
    (a) measuring a first quantity of fuel contained in a fuel tank upon deactivation of an ignition;
    (b) storing said first quantity in a memory means;
    (c) continuously measuring a second quantity of fuel upon activation of an ignition;

(d) providing said first stored quantity to a display means if the engine has been recently activated and if fuel has not been added to the fuel tank after deactivation of the ignition;

(e) providing said second measured quantity to a display means if the engine has been activated for said predetermined period of time.

9. The method as claimed in claim 8, wherein step (d) further comprises providing said second measured quantity if the engine has not been activated for a predetermined period of time and fuel has been added to the fuel tank after deactivation of the ignition.

10. A fuel gauge for indicating the residual quantity of fuel contained in a fuel tank, comprising:

an ignition switch;

a fuel sensing means for detecting a level of fuel contained in the fuel tank;

a calculating means having an output for calculating a residual quantity of fuel according to said level;

memory means, responsive to an ignition switch, for storing said residual quantity detected by said fuel sensing means upon deactivation of an ignition switch;

displaying means for displaying said residual quantity of fuel in the fuel tank;

switching means connected to the ignition switch to be cooperative therewith, said switching means operating, on one hand at the time when the ignition switch is turned ON, to display on said displaying means said value stored in said memory means, and operating, on the other hand during the ignition switch being in an ON state and not just after the ignition switch is turned on, to display on said displaying means a residual quantity of fuel which is periodically detected and calculated by said sensing and calculating means, respectively;

decision means for determining whether fuel was supplied to the fuel tank before the ignition switch was turned on and for increasing said value supplied to said display means when fuel has been supplied to the tank, said decision means comprising:

comparison means for comparing said stored residual quantity with a residual quantity of fuel calculated when the ignition switch is turned on, wherein said comparison means calculates a difference therebetween and compares said difference with a predetermined value, wherein said comparison means determines that fuel was supplied in the tank when said difference exceeds a predetermined value and said calculated residual quantity is supplied to said displaying means; and wherein said comparison means determines that fuel has not been supplied in the tank when said predetermined value exceeds said difference and said stored residual quantity is supplied to said displaying means;

wherein said memory means comprises a memory circuit connected to said switching means and to said decision means for storing a residual quantity of fuel when the ignition switch is turned off and for supplying said stored residual quantity to said decision means; and wherein said decision means receives an output of said switching means and an output of said memory circuit, and wherein an output of said decision means is supplied to said displaying means.

11. A fuel gauge for indicating the residual quantity of fuel contained in a fuel tank, comprising:

fuel sensing means for detecting a level of fuel contained in the fuel tank;

a calculating means having an output for calculating a residual quantity of fuel according to said level;

memory means, responsive to an ignition switch, for storing said residual quantity detected by said fuel sensing means upon deactivation of an ignition switch;

displaying means for displaying said residual quantity of fuel in the fuel tank;

switching means responsive to operation of the ignition switch for selectively providing one of said calculating means output and said stored residual quantity to said displaying means;

wherein said switching means provides said stored residual quantity when the ignition switch has been activated less than a predetermined period of time and fuel has not been added to the fuel tank, and said switching means provides said calculating means output when the ignition switch has been activated for said predetermined period of time;

decision means for determining whether fuel was supplied to the fuel tank before the ignition switch was turned on and for increasing said value supplied to said display means when fuel has been supplied to the tank, said decision means comprising:

comparison means for comparing said stored residual quantity with a residual quantity of fuel calculated when the ignition switch is turned on, wherein said comparison means calculates a difference therebetween and compares said difference with a predetermined value, wherein said comparison means determines that fuel was supplied in the tank when said difference exceeds a predetermined value and said calculated residual quantity is supplied to said displaying means; and wherein said comparison means determines that fuel has not been supplied in the tank when said predetermined value exceeds said difference and said stored residual quantity is supplied to said displaying means;

wherein said memory means comprises a memory circuit connected to said switching means and to said decision means for storing a residual quantity of fuel when the ignition switch is turned off and for supplying said stored residual quantity to said decision means; and wherein said decision means receives an output of said switching means and an output of said memory circuit, a wherein an output of said decision means is supplied to said displaying means.

* * * * *